(12) United States Patent
Reihl

(10) Patent No.: US 6,742,829 B2
(45) Date of Patent: Jun. 1, 2004

(54) LOWERABLE MOTOR VEHICLE ROOF

(75) Inventor: Peter Reihl, Starnberg (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/614,210

(22) Filed: Jul. 8, 2003

(65) Prior Publication Data

US 2004/0007896 A1 Jan. 15, 2004

(30) Foreign Application Priority Data

Jul. 12, 2002 (DE) .......................... 102 31 838

(51) Int. Cl.⁷ ..................... B60J 1/18; B60J 7/14
(52) U.S. Cl. ............. 296/108; 296/107.07; 296/107.08
(58) Field of Search ................. 296/107.07, 107.08, 296/108, 146.14

(56) References Cited

U.S. PATENT DOCUMENTS 6,019,416 A    2/2000  Beierl 6,039,383 A  *  3/2000  Jambor et al. ............. 296/108

FOREIGN PATENT DOCUMENTS

EP    0 922 597 B1    6/2001

* cited by examiner

*Primary Examiner*—Dennis H. Pedder
(74) *Attorney, Agent, or Firm*—Nixon Peabody LLP; David S. Safran

(57) ABSTRACT

A motor vehicle roof which can be lowered into a rear receiving space, with a rear roof part (8) which is pivotally supported on the body and a front roof part (6) which is pivotally supported thereon. The rear roof part (8) has a lengthwise dimension which is equal essentially to twice the lengthwise dimension of the rear window (22). The rear window can be moved out of a position which closes a rear window cutout to under the closed front section of the rear roof part.

13 Claims, 5 Drawing Sheets

LOWERABLE MOTOR VEHICLE ROOF

BACKGROUND OF THE INVENTION

1. Field of the Invention

This invention relates to a lowerable vehicle roof for motor vehicles of the type having a rear roof part with a rear window and at least one front roof part which adjoins the forward enc of the rear roof part, the rear roof part being able to swing to the rear and being supported on the vehicle body to be able to be lowered into a rear receiving space, and the front roof part being supported in the area of the front edge of the rear roof part to be able to swing into a position which adjoins the inside of the rear roof part, and the rear window being movable between a position which closes a rear window cutout and a position which clears the window cutout.

2. Description of Related Art

Lowerable motor vehicle roofs of the above-mentioned type are known in different embodiments, especially as hardtop roofs for roadster-like sports cars. Such roofs make it possible to easily convert a closed motor vehicle provided with a hardtop into an open vehicle. In the open version, the entire motor vehicle roof is housed in a receiving space which can be covered by a cover and which is provided in the rear part of the motor vehicle.

Published European Patent Application EP 0 922 597 B1 and its counterpart U.S. Pat. No. 6,019,416 disclose a lowerable motor vehicle roof of the type noted above. Here, on the rear roof part, between the side pieces which border it laterally, there is a middle part which can be moved in the lengthwise direction and which comprises a rear window and a frame strip which reduces it to a given size. This middle part can be moved completely forward to under the front roof part. So that the middle part can be completely held under the front roof part, it must have at least one lengthwise dimension which corresponds to that of the middle part. It is pointed out here that the expressions "lengthwise direction" and "lengthwise dimension" generally refer to the displacement direction of the rear window and generally agree with the direction of travel of the motor vehicle, also in this embodiment.

In the known construction, the motor vehicle roof is divided in the lengthwise direction in a ratio 1:1, i.e., the front and the rear roof part each have roughly the same lengthwise direction. Such a design is especially effective in a two-part roof package and thus yields the smallest possible lengthwise dimension of the receiving space. A smaller lengthwise dimension of the front roof part would mean that the middle part cannot be completely accommodated under it, a result of which swinging of the front roof part relative to the rear roof part would no longer be possible, while a larger dimension of the front roof part would mean a larger lengthwise dimension of the roof package which has been folded together. When the motor vehicle roof is divided in a ratio 1:1, the lengthwise dimension of the rear roof part, on the other hand, is generally so large that it cannot fully correspond to the lengthwise dimension of the rear window, since then the area of the rear window becomes too large, for example, with respect to the possible incident solar radiation. For this reason, in the known construction, the area of the rear window is reduced to a reasonable size by providing a frame strip. In addition to the described disadvantages of the known structure, however, it is regarded as especially disadvantageous that the middle part is pushed beyond the joint between the front and the rear roof part and that, accordingly, the guide rails for the middle part must extend beyond the joint and a possible displacement drive beyond this joint must be effective; this is structurally very complex.

SUMMARY OF THE INVENTION

A primary object of this invention is to devise a motor vehicle roof of the type mentioned initially above, which is structurally simple and enables a division of the surface which is more favorable relative to the known construction.

This object is achieved in accordance with the invention in that the rear roof part has a dimension in the lengthwise direction of the motor vehicle roof which corresponds to at least twice the lengthwise dimension of the rear window, comprising a rear section which has a rear window cutout and a front section which forms a closed surface, the rear window being adjustably supported on the rear roof part between the rear position which closes the rear window cutout and the front position which is covered with the front section.

It is pointed out that the terms "front" and "rear" relate here, for example, to the direction of adjustment of the rear window in or opposite the direction of opening of the rear window, which in this embodiment, also agree with the direction of travel of the motor vehicle or the opposite direction.

According to this invention, the rear roof part is dimensioned such that the rear window within the rear roof part can be adjusted between its rear position which closes the rear window cutout and its front position which clears it. Accordingly, the rear window need not be pushed over the joint to the roof part which forwardly adjoins it, so that guides which bridge this joint, and optionally, a displacement drive which is effective beyond this joint, are not necessary. In this way, the structural simplification as compared to the aforementioned known design is considerable.

In one preferred embodiment of the invention, the motor vehicle roof is divided into two parts, i.e., the rear roof part is forwardly adjoined by a single front roof part; the latter, preferably, has a lengthwise dimension which is essentially roughly equal to the lengthwise dimension of the front section of the rear roof part, the rear window cutout being open to the rear, i.e., the side pieces which border it laterally are not joined to one another on their back ends; this embodiment makes it possible to arrange the motor vehicle roof in the lowered state such that the two side pieces (C pillars) which border the rear window cutout extend forward laterally next to the rear seat or rear seatback, so that the receiving space necessary for holding the remainder of the roof package can be made correspondingly smaller, as is described more accurately using one embodiment.

One especially favorable design of the motor vehicle roof arises when the lengthwise dimensions of the front roof part and of the front and rear section of the rear roof part are each essentially the same. It has been found that, in this design, a reasonable rear window size results with an area which need not be made artificially smaller by more or less wide frame parts.

For the rear window, various supports are possible; in one preferred embodiment of the invention, the rear window is movably supported in lateral guide rails located on the rear roof part, preferably, such that the rear window can be lowered out of a rear closed position, which is flush with the top surface of the rear roof part, to under this surface, and can be moved forward into the open position or vice versa. One such arrangement is already known from sliding roofs for motor vehicles.

According to a preferred embodiment of the invention, it is provided that the side pieces (C pillars) which laterally border the rear roof part are supported on the motor vehicle body to be able to pivot directly around a first pivot axes which lies transversely to the lengthwise axis of the motor vehicle. Pivot supports represent structurally especially simple supports.

According to another embodiment, the front roof part is supported on the rear roof part to be able to pivot around a second pivot axis which lies in the area of the joint between these roof parts.

In order to pivot the rear roof part between its closed position and its lowered position, in another embodiment, it is provided that the rear roof part is drive-coupled to an actuator for the pivoting motion. The front roof part is preferably coupled via at least one linkage gear which is located on a side of the vehicle to the rear roof part such that, when the rear roof part is pivoted to the rear, the front roof part pivots automatically into contact with it and vice versa. In this way, the front roof part does not require its own drive.

The linkage gear according to an embodiment of the invention is made as a four-bar mechanism, with a connecting rod with a roof-side end coupled to the front roof part and with a body-side end coupled to the body such that the coupling points of the connecting rod and the first pivot axis of the rear roof part and the second pivot axis of the front roof part form the four hinge points of the four-bar mechanism, as is described using one embodiment.

In order for the C pillars to extend in the above desired manner, laterally next to the rear seat with the motor vehicle roof lowered, in another embodiment of the invention, it is provided that the C pillars are pivotally supported essentially at a coupling point which lies between their rear and front end point. In this way, the rear sections of the C pillars are pivoted forward when the rear roof part is pivoted to the rear, and they can travel from underneath into a position which lies next to the back seat or the back seatback.

According to another embodiment of the invention, the receiving space for accommodating the motor vehicle roof has a cover which can be pivoted, around a pivot axis which is located in the area of its rear edge and which lies transversely to the lengthwise axis of the motor vehicle, between a closed position which closes the receiving space and a pivoted-up open position which clears it, a shelf surface fixed on the front edge of the cover with a width which corresponds at most to the width of the rear window cutout. The shelf surface, which lies inside with the motor vehicle roof closed, can be easily entrained when the motor vehicle roof is opened, after pushing the rear window forward, when the cover is pivoted up through the rear window opening, so that a separate adjustable support and separate drive for the shelf surface is not necessary. The access opening of the receiving space is enlarged by entraining the shelf surface.

In order to close the surface areas which are occupied by the C pillars, which are located laterally next to the shelf surface after pivoting and lowering the motor vehicle roof, and with the motor vehicle roof closed, according to another embodiment of the invention, there are surface elements on the shelf surface which can be displaced laterally between a first operating position which lies under the shelf surface and an extended second operating position which laterally flushly adjoins the shelf surface, and which have a horizontal projection which corresponds to the base surface of the C pillars.

One embodiment of the invention is shown in the drawings and is explained detail below.

DETAILED DESCRIPTION OF THE INVENTION

Figure 1:
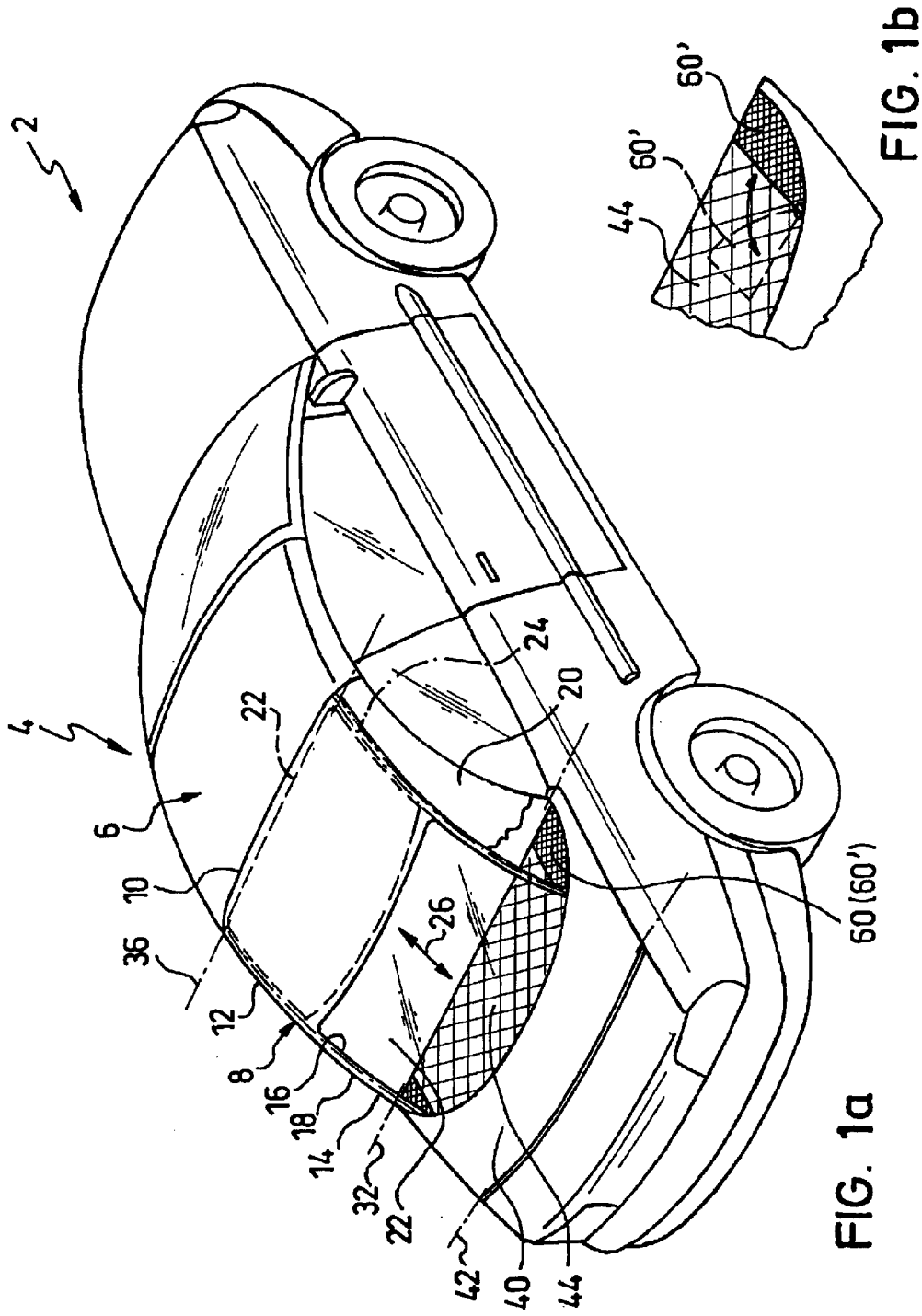
FIG. 1a is a perspective view from overhead of a motor vehicle with a lowerable motor vehicle roof.
FIG. 1b shows an enlarged detail from FIG. 1 of the corner area of the shelf surface.

FIG. 1a shows a motor vehicle 2 with a lowerable motor vehicle roof 4 which, in this embodiment, comprises a front roof part 6 and a rear roof part 8 which border one another at a joint 10. One preferred two-part motor vehicle roof is described here; basically, arrangements are also contemplated in which the front roof part 6 is adjoined by at least one additional roof part.

The rear roof part 8 has a front section 12 and a rear section 14. The rear section 14 forms a rear window opening 16 which is bordered laterally by side pieces 18, 20 (C pillars). The rear window 22 can be moved between a closed position in which it closes the rear window opening 16 and an open position which is shown by the broken line and in which window 22 is pushed forward to under the front section 12 of the rear roof part 8. On the two side pieces 18, 20, there are guide rails for movably supporting the rear window 22, as is indicated by the dot-dash line 24 in FIG. 1a.

Figure 2:
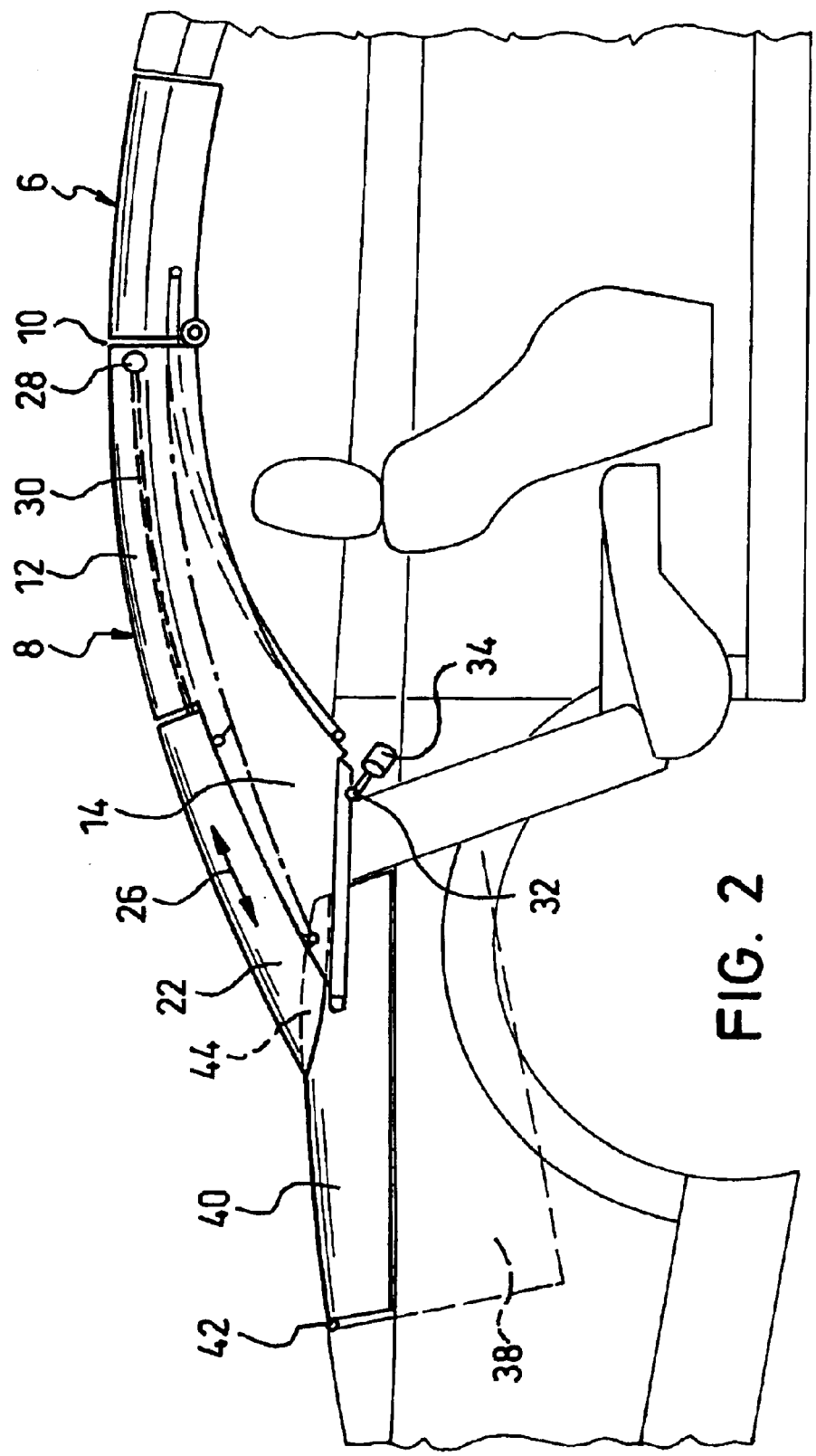
FIG. 2 is an side elevational view of the motor vehicle shown in FIG. 1 with the motor vehicle roof closed.

The rear window 22 is moved in the directions of the double arrow 26, for example, via an actuator 28 and drive cable 30 located in the front section 12, as is shown in FIG. 2.

Figure 3:
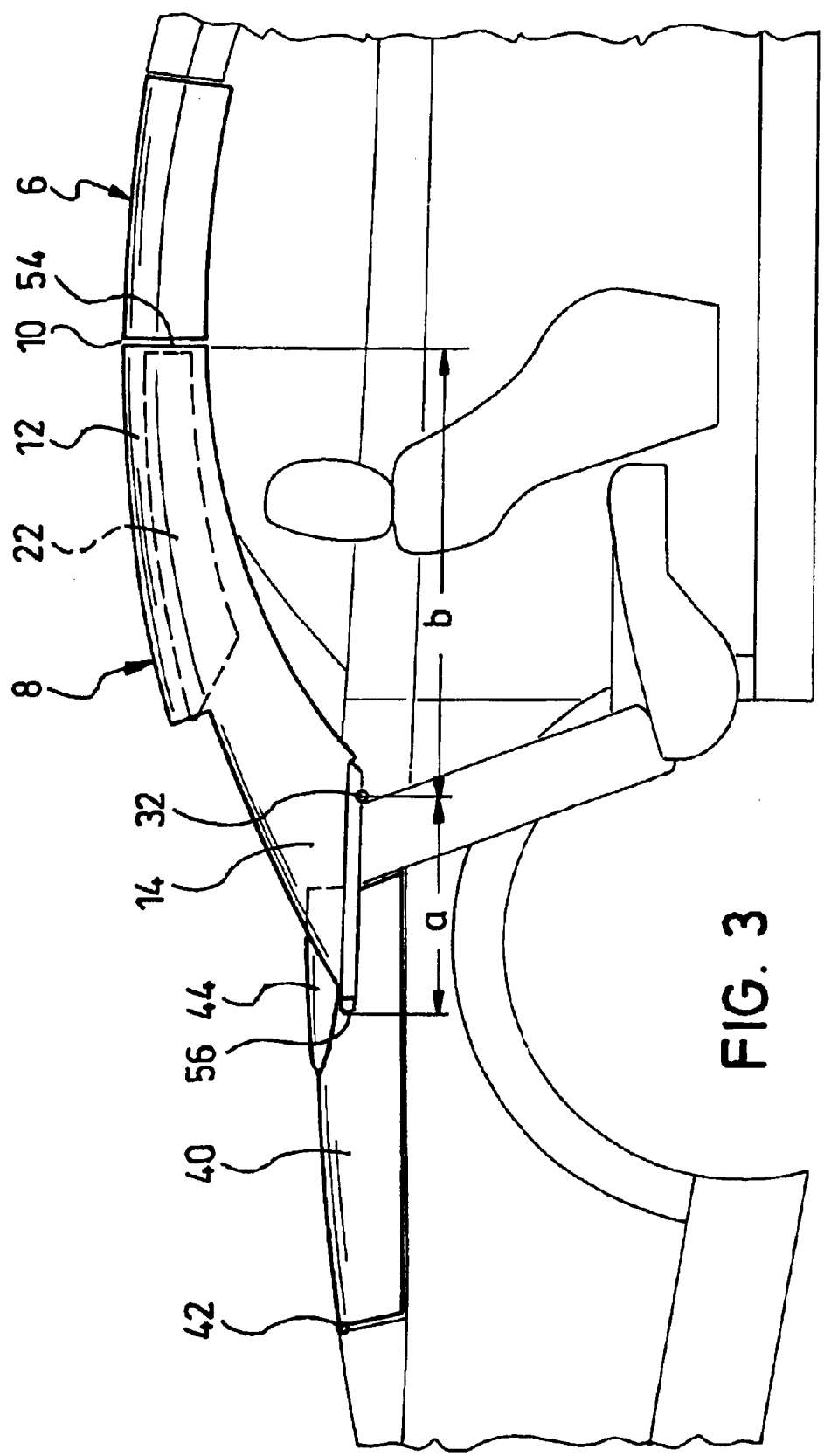
FIG. 3 shows a view corresponding to FIG. 2, with a rear window which has been pushed into the open position.
Figure 4:
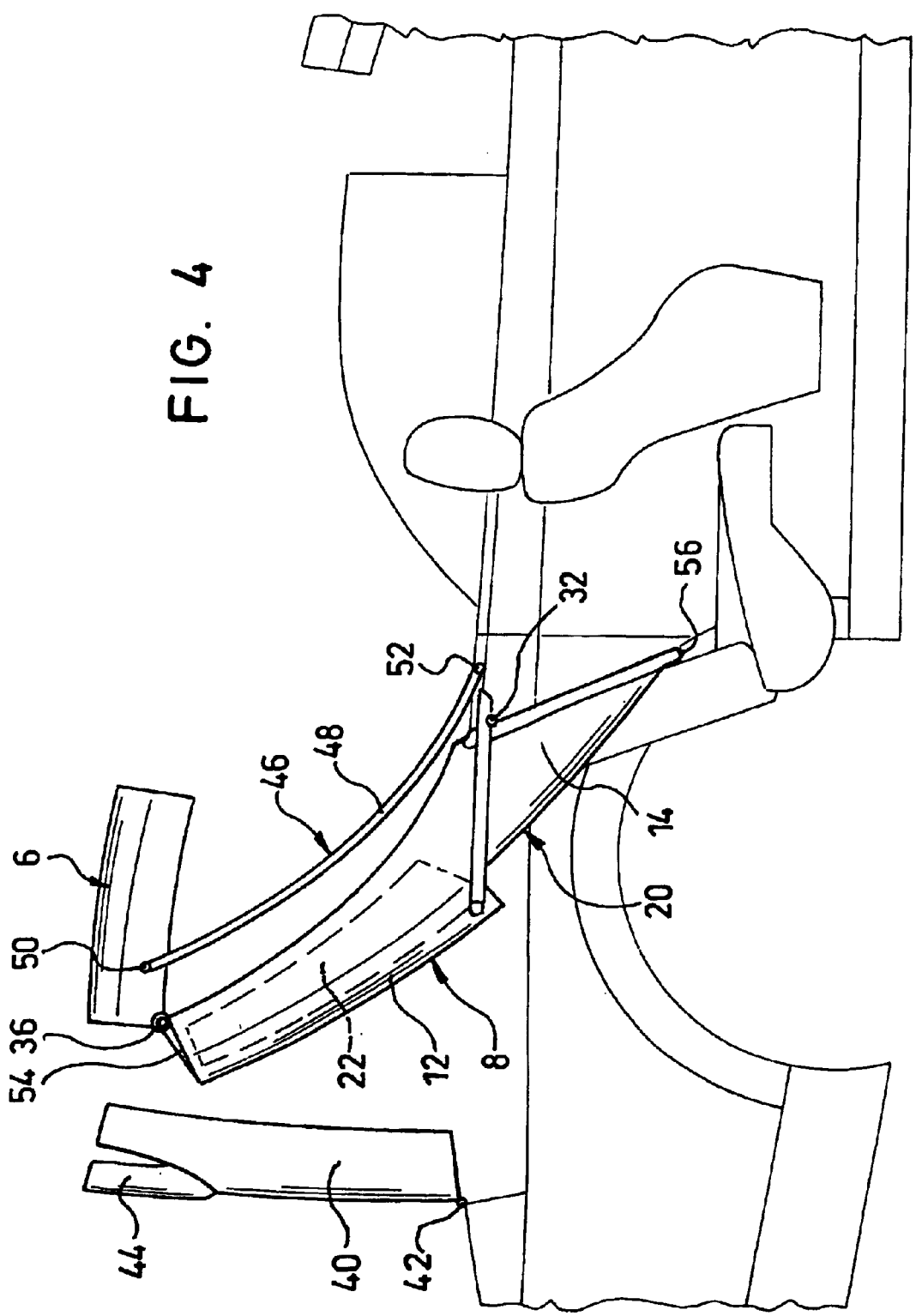
FIG. 4 shows a view corresponding to FIGS. 2 and 3, with the opened receiving space cover and the motor vehicle roof swung partially to the rear.
Figure 5:
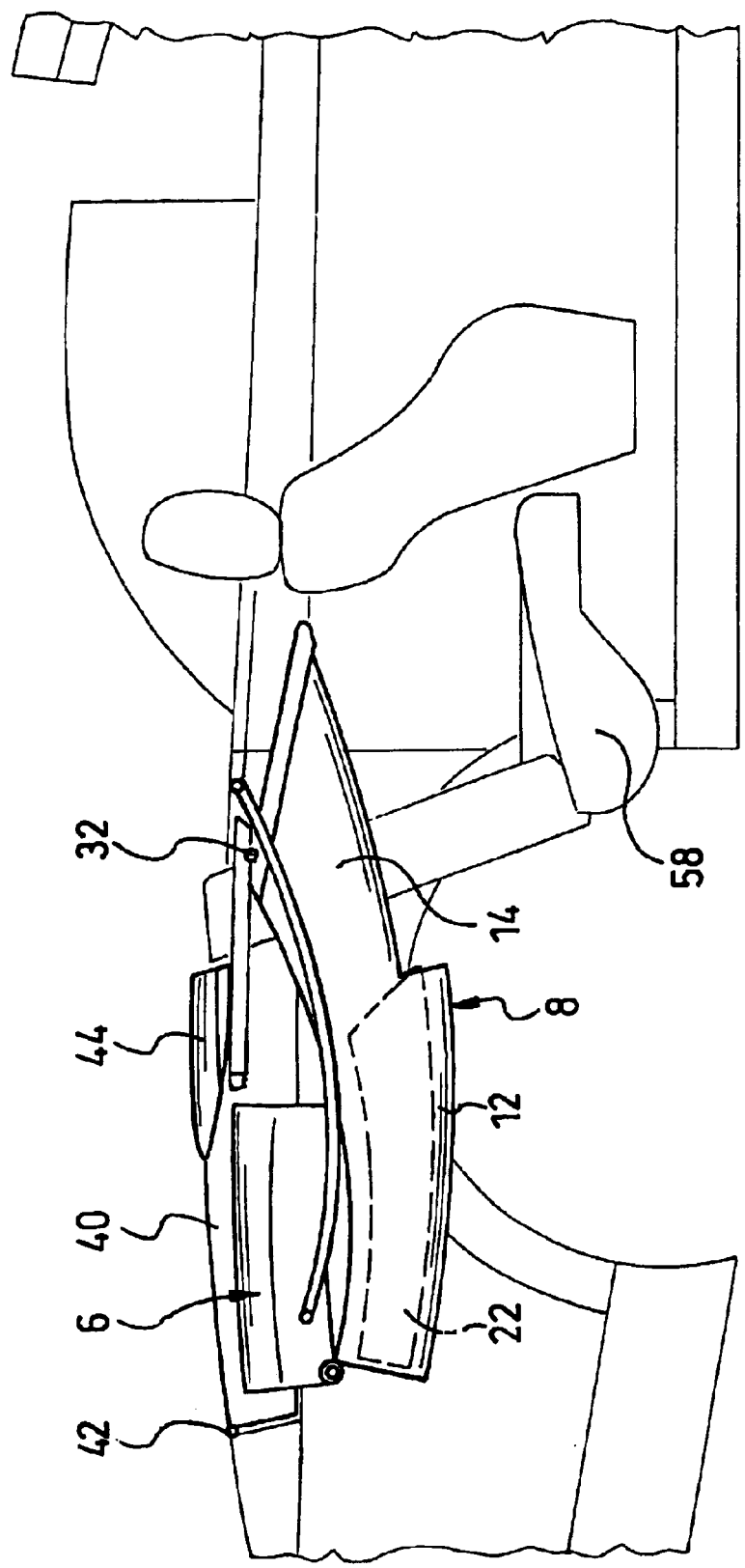
FIG. 5 is a view corresponding to FIGS. 2 to 4, with the motor vehicle roof completely lowered and the receiving space cover closed.

The rear roof part 8 is located on the body to be able to pivot to the rear around a first pivot axis 32, as is shown in greater detail using FIGS. 3 to 5; the drive for retracting the roof into a rear receiving space 38 is, for example, an actuator 34 which is located in the vehicle body (see FIG. 2) and which is drive-connected to the rear roof part via gear means.

The front roof part 6 is supported in the area of the joint 10 on the rear roof part 8 to be able to pivot around a second pivot axis 36 and is coupled to it via a linkage (which will be explained with reference to FIGS. 2 to 5) such that the linkage is automatically swings down the front roof part 6 when the rear roof part 8 is pivoted to the rear.

The entire motor vehicle roof 4 can be lowered into the rear receiving space 38 which can be closed by a cover 40. As indicated especially by FIG. 4, the cover 40 can be pivoted around a pivot axis 42, which lies in the area of its rear edge, between a closed position in which closes the receiving space 38 and which is shown, by way of example, in FIG. 2, and an open position (shown in FIG. 4) in which opens the receiving space 38. driving of the cover 40 in its pivoting motion takes place via either its own actuator or a coupling means (not shown) when the rear roof part 8 pivots.

As the figures further indicate, on the front edge of the cover 40 is a shelf surface 44 which is located within the vehicle with the motor vehicle roof closed, the rear window 22, in its closed position, lying with its back edge on the separating line between the cover 40 and shelf surface 44, forming a seal.

The motor vehicle roof works as follows:

In order to move the motor vehicle roof 4 out of the closed state (FIGS. 1a and 2) into the open state (FIG. 5), first, the rear window 22 is pushed forward by means of the actuator 28 to under the front section 12 of the rear roof part 8. In the manner known for sliding roofs, it is first lowered to below the height of the front section 12 and then is pushed under it so that it assumes the position shown in FIG. 3. Then, in the next phase, the cover 40 is swung up into the open position shown in FIG. 4, the shelf 44 being entrained with it and being able to pass through the open rear window cutout 16. In the next phase, the rear roof part 8 is swung to the rear (see FIG. 4), the front roof part 6 being automatically pivoted down by means of the linkage 46 (which is still to be described) into the position which adjoins the underside of the rear roof part 8. If the motor vehicle roof package which has been folded together in this way is lowered into the receiving space 38 (see FIG. 5), then the cover 40 is pivoted back into its closed position, the shelf surface 44 forming part of the cover which covers the receiving space 38.

The linkage 46 comprises a linkage lever 48 which has a roof-side end coupled to the front roof part 6 at a coupling point 50, and with the body-side end coupled at to the body of the motor vehicle a coupling point 52. As indicated especially in FIG. 4, the pivot axes 32, 36 and the coupling points 50, 52 form four points of a four-bar mechanism. As a result, when the rear roof part 8 is pivoted to the rear, the front roof part 6 is pulled down by the linkage lever 48 and thus is pivoted relative to the rear roof part such that it is caused adjoins the inside of the rear roof part, generally parallel to it.

As FIGS. 3 & 4 show in particular, the first pivot axis for the rear roof part 8 lies in the area between the front end 54 and the rear end 56, the C pillars 18, 20, and in this embodiment with a distance a from the rear end point 54 which corresponds, for example, roughly to one third of the total length of the rear roof part. In this way, the section of the rear roof part which is located behind the first pivot axis 32, pivots when the rear roof part is pivoted out of the closed position shown in FIG. 3 into the opened position shown in FIG. 5. In doing so, the section which is behind the pivot axis 32. first swivels down and then forward into a position which is laterally next to the back seat 58 so that it does not occupy any space in the actual receiving space 38. The receiving space 38 and the receiving space opening assigned to it must therefore be tailored simply to the length b of the rear roof part, which length is in front of the pivot axis 32, so that the receiving space can be made smaller overall.

As is apparent especially from FIG. 1a, the shelf surface 44 with the motor vehicle roof closed borders the respective side pieces 18, 20 (C pillars) on each side and overall has a width which is not greater than that of the rear window opening 16. The base area occupied by the side pieces 18, 20, with the motor vehicle roof closed (see the base area 60 of the side piece 20), is open when the motor vehicle roof is lowered. In order to close the area corresponding to this base area 60, on either side of the shelf surface 44 there are surface elements 60' which can be moved out of a first operating position (shown by the broken line in FIG. 1b) which lies under the shelf surface 44 and into a second operating position which laterally flushly adjoins the shelf surface 44.

When the motor vehicle roof 4 is moved from the opened position shown in FIG. 5 into the closed position which is shown in FIG. 2 the above described processes proceed in reverse.

What is claimed is:

1. Lowerable vehicle roof for motor vehicles, comprising:
   a rear roof part which has a rear window cutout and a rear window, the rear window being mounted for displacement between a closed position in which the rear window closes the rear window cutout and a position in which the rear window clears the rear window cutout, and
   at least one front roof part, the rear roof part adjoining the front roof part and the front roof part being supported in an area of a front edge of the rear roof part to be able to pivot into a position which adjoins an underside of the rear roof part, and the roof parts being supportable on a vehicle body so as to be lowerable together into a rear receiving space of the vehicle body;
   wherein the rear roof part has a dimension in a longitudinal direction of the vehicle roof which corresponds to at least twice a lengthwise dimension of the rear window, the rear roof part comprising a rear section which has the rear window cutout and a front section which forms a closed surface, and
   wherein the position of the rear window which clears the rear window cutout is a forward position in which the rear window is covered with the front section of the rear roof part.

2. Lowerable motor vehicle roof as claimed in claim 1, wherein the front roof part has a lengthwise dimension which is about equal to the lengthwise dimension of the front section of the rear roof part, and wherein the rear window cutout is rearwardly open.

3. Lowerable motor vehicle roof as claimed in claim 2, wherein the lengthwise dimensions of the front roof part, and each of the front and rear sections of the rear roof part are essentially the same.

4. Lowerable motor vehicle roof as claimed in claim 1, further comprising lateral guide rails located on the rear roof part, the rear window being movably supported in the lateral guide rails.

5. Lowerable motor vehicle roof as claimed in claim 1, wherein the rear window is flush with an outer side of the rear roof part in said closed position, and wherein the rear window is lowerable to below the outer side of the rear roof part and is movable forward into the open position.

6. Lowerable motor vehicle roof as claimed in claim 1, wherein side pieces laterally border the rear roof part and are supported on the motor vehicle body to pivot around a first pivot axis which lies transversely to the longitudinal axis of the motor vehicle roof.

7. Lowerable motor vehicle roof as claimed in claim 6, wherein the front roof part is supported on the rear roof part to pivot around a second pivot axis which lies in an area of a joint between the front and roof parts.

8. Lowerable motor vehicle roof as claimed claim 1, further comprising an actuator drive-coupled to the rear roof part for pivoting the rear roof part.

9. Lowerable motor vehicle roof as claimed in claim 7, wherein the front roof part is coupled via at least one linkage to the rear roof part, the at least one linkage being adapted to automatically produce pivoting of the front roof part to the rear into contact with the rear roof part when the rear roof part is pivoted.

10. Lowerable motor vehicle roof as claimed in claims 9, wherein the linkage comprises a four-bar mechanism having a connecting rod with a roof-side end coupled to the front roof part and with a body-side end coupled to the body such that the coupling points of the connecting rod and the first pivot axis of the rear roof part and the second pivot axis form four hinge points of the four-bar mechanism.

11. Lowerable motor vehicle roof as claimed in claim 6, wherein the side pieces are C pillars and are pivotally supported essentially at a coupling point which lies between a back end and a front end of the rear roof part.

12. Lowerable motor vehicle roof as claimed in claim 2, wherein the receiving space has a cover is mounted to pivot around a pivot axis which is located in an area of its rear edge and which lies transversely to the longitudinal axis of the roof, between a closed position which closes the receiving space and a pivoted-up open position which clears the receiving space, and wherein a shelf surface is fixed on a front edge of the cover, the shelf surface having a width which is at most equal to the width of the rear window cutout.

13. Lowerable motor vehicle roof as claimed in claim 12, wherein the shelf surface has surface elements which are laterally adjustable between a first operating position which lies under the shelf surface and an extended second operating position which laterally flushly adjoins the shelf surface and which have a horizontal projection which corresponds to a base surface of C pillars of the vehicle.

* * * * *